US 6,675,086 B2

(12) United States Patent
Hellmann et al.

(10) Patent No.: US 6,675,086 B2
(45) Date of Patent: Jan. 6, 2004

(54) METHOD FOR INTERRUPTING A SPEED CONTROL OR VEHICLE TO VEHICLE RANGING IN A CONTROL SYSTEM OF A MOTOR VEHICLE

(75) Inventors: Manfred Hellmann, Hardthof (DE); Thilo Beck, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 09/980,071

(22) PCT Filed: Feb. 13, 2001

(86) PCT No.: PCT/DE01/00538

§ 371 (c)(1),
(2), (4) Date: Nov. 27, 2001

(87) PCT Pub. No.: WO01/72544

PCT Pub. Date: Oct. 4, 2001

(65) Prior Publication Data

US 2002/0165655 A1 Nov. 7, 2002

(30) Foreign Application Priority Data

Mar. 28, 2000 (DE) .......................................... 100 15 301

(51) Int. Cl.$^7$ .............................. G06F 7/00; G01S 13/60
(52) U.S. Cl. .............................. 701/93; 701/70; 701/91; 701/118; 701/119; 701/301; 342/71; 342/109

(58) Field of Search ............................... 701/93, 70, 78, 701/83, 91, 110, 118, 119, 301; 342/71, 109; 340/435, 436, 903

(56) References Cited

U.S. PATENT DOCUMENTS 5,493,302 A * 2/1996 Woll et al. ..................... 342/71
6,094,616 A * 7/2000 Andreas et al. ................ 701/96

FOREIGN PATENT DOCUMENTS

| DE | 199 13 620 | 10/1999 |
| EP | 0 874 149 | 10/1998 |
| EP | 0 982 172 | 3/2000 |
| EP | 0 992 412 | 4/2000 |

* cited by examiner

Primary Examiner—William A. Cuchlinski, Jr.
Assistant Examiner—Arthur D. Donnelly
(74) Attorney, Agent, or Firm—Kenyon & Kenyon

(57) ABSTRACT

A method for interrupting a speed control or vehicle to vehicle ranging of a motor vehicle's control system, in which the system passes over into the standby mode with the aid of a predefined algorithm after the switching-off of the active control. A linear function for the acceleration in the case of propulsion as well as the braking case is provided as the algorithm. In an alternative embodiment using a step function having appropriately designed steps is provided. This achieves in an advantageous manner a soft transition from active control operation to the standby mode.

10 Claims, 3 Drawing Sheets

METHOD FOR INTERRUPTING A SPEED CONTROL OR VEHICLE TO VEHICLE RANGING IN A CONTROL SYSTEM OF A MOTOR VEHICLE

BACKGROUND INFORMATION

Control systems are known per se for regulating a predefined travel speed (cruise control, CC) or for regulating a vehicle to vehicle distance, such as a vehicle distance warning device (adaptive cruise control, ACC). These systems regulate a predefined travel speed or a minimum distance from a preceding vehicle, without need for the driver's intervention. To be sure, in each case the driver of the vehicle has control over all control systems, and is able to shut off the running control system using an appropriate switch. If the control system just happens to be in an accelerating or decelerating phase, the switching off interrupts this process more or less abruptly, which has the effect of influencing riding comfort.

SUMMARY OF THE INVENTION

The method according to the present invention of interrupting a speed control or vehicle to vehicle ranging of a control system has the advantage that after activating an appropriate switch, the presently active control is not abruptly stopped, but that the method strives for a setpoint value of the acceleration during deceleration as well as acceleration, using a predefined algorithm. This algorithm is picked in such a way that a soft transition is achieved from the control operation to a standby mode.

It is especially advantageous that the setpoint acceleration value in the case of propulsion is reduced according to the given algorithm and increased in the case of braking, respectively. Because of this, it is advantageously achieved that, for example, after switching off a predefined setpoint speed, the vehicle passes over into stationary travel operation without shaking or jerking motions. Correspondingly, in the braking case, it is achieved that annoying pitching motions are omitted. During night travel especially, this avoids that the headlight cone swings up and down because of the pitching motion, and that oncoming traffic participants may be blinded by headlight glare.

One beneficial method is a linear transition from control operation to standby mode using a linear function. In an alternative embodiment, using a ramp function with appropriate steps is also conceivable.

In the braking case, the control system advantageously acts on a braking unit, such as an ABS or an ESP (electronic stability program) system which gives the braking pressure for a predefined setpoint delay. Thus, according to the predefined algorithm, the braking delay can advantageously be carried out until a minimum braking pressure is achieved in the braking system. Only after that is the control system switched off, since, with a braking pressure in the range of 0, no further braking delay appears.

Correspondingly, in the case of propulsion, the control system is switched off when the minimum acceleration boundary is undershot, so that in this case, too, a soft transition to stationary travel operation takes place.

Since many modern vehicles are outfitted with an automatic transmission, it is advantageous to prevent shifting into another transmission gear until the control system has been switched off. This advantageously prevents, for example, an unnecessary roaring of the engine during shifting downwards.

It is also regarded as favorable that the method is implemented in the control system as a software program, since the software program is easy to produce, and, on the other hand, can be simply adapted to individual vehicle types. In order to save costs and effort, the software program is advantageously built into an already existing control device of the vehicle. This can be, for instance, an ESP, a vehicle to vehicle distance control or a cruise control system.

DETAILED DESCRIPTION

Figure 1:
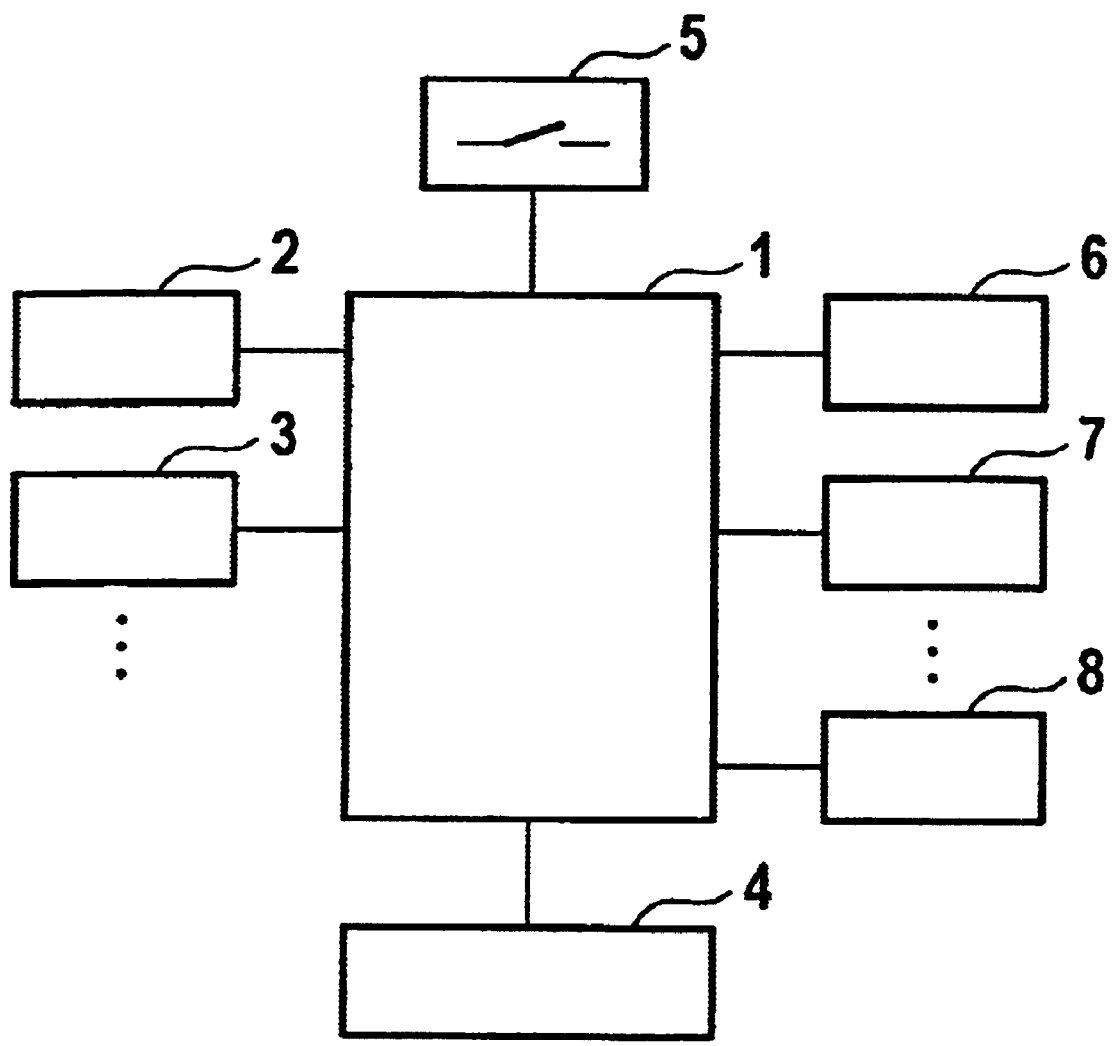
FIG. 1 shows a block diagram.

The block diagram of FIG. 1 shows a control unit 1 which is connected, for instance on the input side, to a speed sensor 2 and a distance sensor 3. Speed sensor 2 is preferably a wheel sensor which is used for an existing ABS. Optical as well as radar-based sensors can be used as distance sensor 3. These sensors are known per se, and therefore do not need to be explained in more detail.

Control unit 1 contains all elements required for speed control and distance control. Technical details are likewise known. At the output side, control unit 1 accesses a braking unit 6 or an engine control mechanism 7. Braking unit 6 is, for instance an ABS or an ESP, which are also known. Further control units may be connected to the appropriate outputs of control unit 1. It is advantageous, for example, to connect control unit 1 to a transmission control 8. During the transition from controlled to uncontrolled operation, shifting of the transmission with the aid of transmission control 8 is advantageously prevented.

Figure 2:
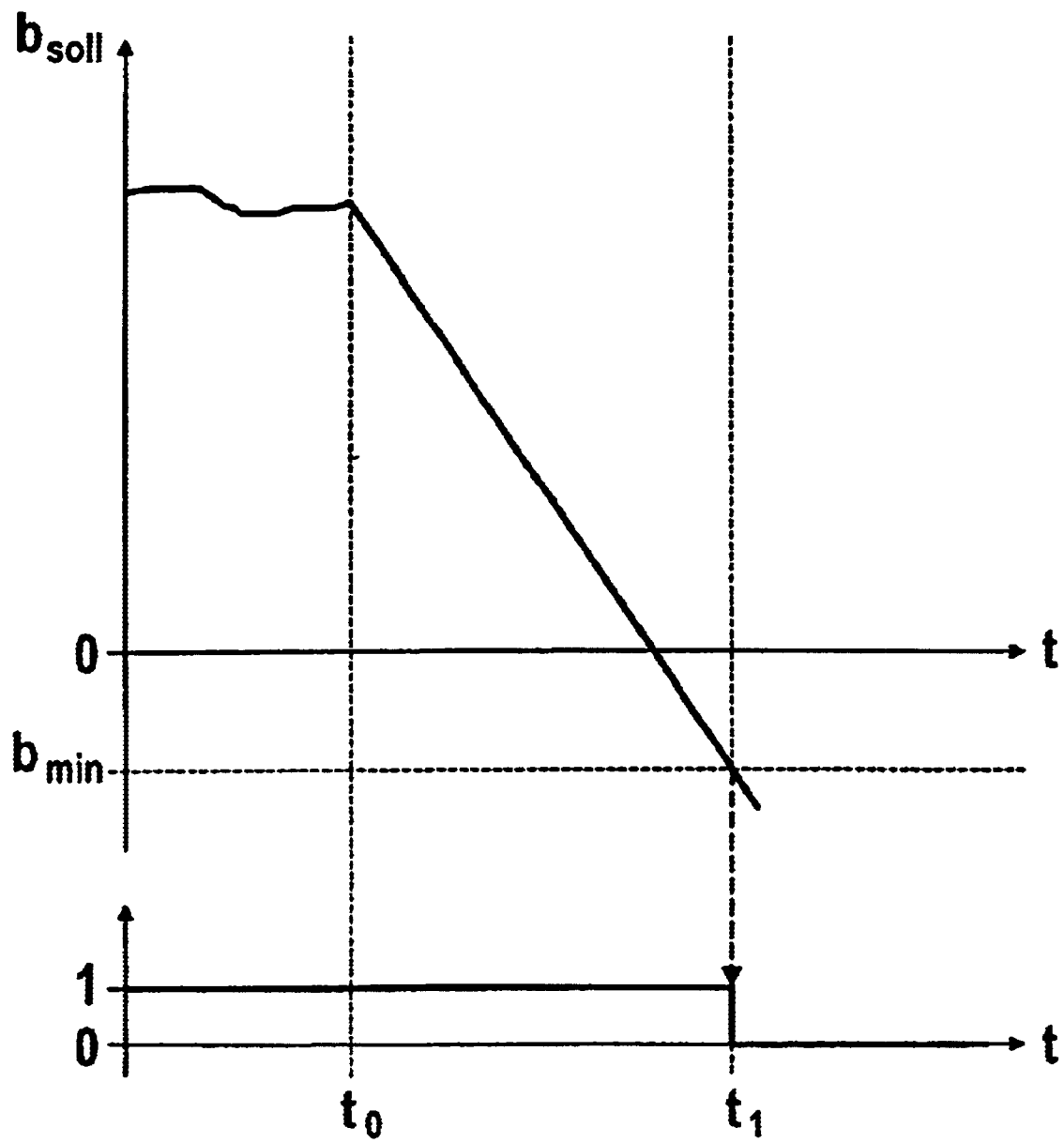
FIG. 2 shows a diagram of a control algorithm in the case of propulsion.
Figure 3:
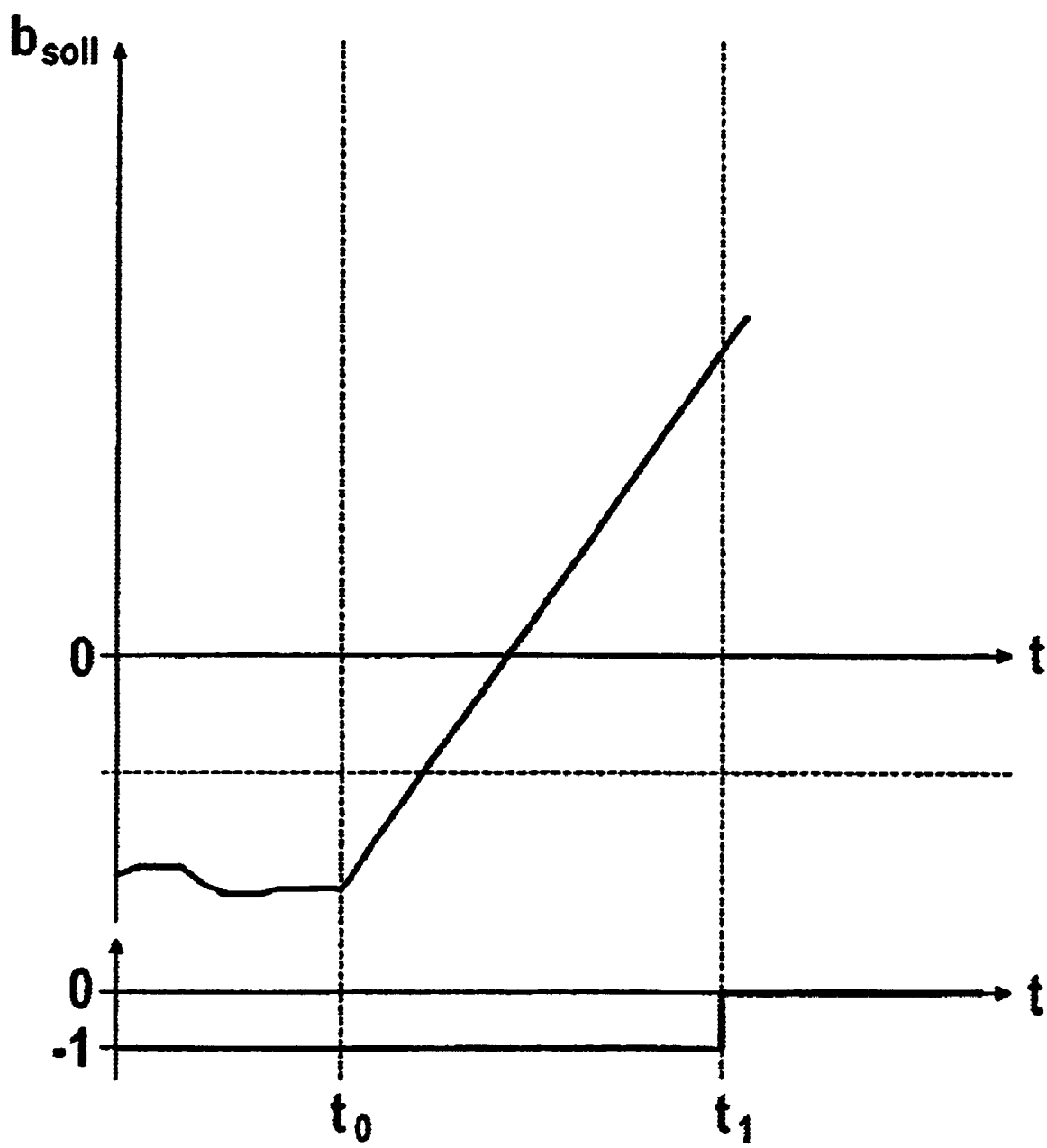
FIG. 3 shows a diagram of a control algorithm in the braking case.

The way of functioning of the present invention is explained in greater detail with the aid of FIGS. 2 and 3. FIG. 2 shows a situation in which the control system tries, in the case of propulsion, to maintain a predefined setpoint acceleration bSoll or setpoint speed, and then, at point in time t0, the driver activates switch 5, so as to switch off active control. According to the present invention, the use of the predefined algorithm occurs after the switching-off at point in time t0. According to FIG. 2, the vehicle speed is now reduced using a linear function, until a minimum acceleration value bmin is reached at point in time t1. After that, control system 10 is switched off, and thus is in standby mode. This process can be seen again on the lower curve. Until t1, control system 10 is still actively connected (logic 1), whereas after time t1 it is switched off (logic 0).

This is indicated by the jump function.

In an alternative embodiment of the present invention it is provided for the algorithm to use a ramp function instead of the straight line function, using correspondingly small ramp steps or the like.

Analogous to this, FIG. 3 shows a diagram for a control algorithm in the braking case. In this case too, one begins by having control system 10 in active control mode, and at time t0 the vehicle's driver activates switch 5. After time t0 the vehicle is decelerated less strongly, which is illustrated by the positive acceleration curve. At time t1 control system 10 passes over into the standby mode, so that at this time no further braking action appears. The braking pressure in the braking system is then 0. This behavior is likewise shown by the lower curve.

What is claimed is:

1. A method for interrupting one of a speed control and a vehicle-to-vehicle ranging in a control system of a motor vehicle, comprising:
   interrupting, by a driver of the motor vehicle, a presently active control mode by activating a switch; and
   adjusting a setpoint acceleration value, by the control system, in response to the activation of the switch, according to a predefined algorithm, by which a soft transition from a control operation to a standby mode is achieved.

2. A method for interrupting one of a speed control and a vehicle-to-vehicle ranging in a control system of a motor vehicle, comprising:
   interrupting, by a driver of the motor vehicle, a presently active control mode by activating a switch; and
   adjusting a setpoint acceleration value, by the control system, in response to the activation of the switch, according to a predefined algorithm, by which a soft transition from a control operation to a standby mode is achieved;
   wherein the setpoint acceleration value is reduced in a case of propulsion, and wherein the setpoint acceleration value is increased in a case of braking.

3. The method according to claim 1, wherein the predefined algorithm has a linear function.

4. The method according to claim 1, wherein the predefined algorithm has a ramp function.

5. The method according to claim 1, further comprising acting on, by the control system, a braking unit which controls a braking pressure in a braking system.

6. The method according to claim 5, further comprising switching off, by the control system, a control in a braking case in response to a minimum braking pressure being undershot.

7. The method according to claim 1, further comprising switching off, by the control system, a control in a propulsion case in response to a minimum acceleration being undershot.

8. The method according to claim 1, further comprising blocking, by the control system, a shifting of a transmission up to a switch-off time.

9. The method according to claim 1, wherein the control system includes a software program for providing a soft switching-off of a control.

10. The method according to claim 9, wherein the software program is a component of a control unit in the motor vehicle.

* * * * *